US009975279B2

(12) United States Patent
Salandre

(10) Patent No.: US 9,975,279 B2
(45) Date of Patent: May 22, 2018

(54) METHODS FOR MAKING INFLATABLE INTERIOR PANEL ARRANGEMENTS FOR MOTOR VEHICLES

(71) Applicant: Faurecia Interior Systems, Inc., Auburn Hills, MI (US)

(72) Inventor: Maxime Salandre, Auburn Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 371 days.

(21) Appl. No.: 14/920,215

(22) Filed: Oct. 22, 2015

(65) Prior Publication Data

US 2017/0113380 A1  Apr. 27, 2017

(51) Int. Cl.
| | |
|---|---|
| *B29C 41/04* | (2006.01) |
| *B29C 41/08* | (2006.01) |
| *B29C 41/22* | (2006.01) |
| *B29K 75/00* | (2006.01) |
| *B29L 9/00* | (2006.01) |
| *B29L 31/30* | (2006.01) |
| *B29K 221/00* | (2006.01) |
| *B29K 63/00* | (2006.01) |

(52) U.S. Cl.
CPC .............. *B29C 41/04* (2013.01); *B29C 41/08* (2013.01); *B29C 41/22* (2013.01); *B29K 2063/00* (2013.01); *B29K 2075/00* (2013.01); *B29K 2221/003* (2013.01); *B29L 2009/00* (2013.01); *B29L 2031/3038* (2013.01); *B29L 2031/3055* (2013.01)

(58) Field of Classification Search
CPC ......... B29C 41/04; B29C 41/22; B29C 41/08; B29L 2031/3038; B29L 2031/3055; B29L 2009/00; B29K 2063/00; B29K 2221/003; B29K 2075/00
See application file for complete search history.

(56) References Cited

U.S. PATENT DOCUMENTS

| | | | |
|---|---|---|---|
| 4,217,325 | A | 8/1980 | Colby |
| 5,536,043 | A | 7/1996 | Lang et al. |
| 6,302,437 | B1 | 10/2001 | Marriott et al. |
| 2003/0005933 | A1 | 1/2003 | Izuchukwu |
| 2003/0119981 | A1 | 6/2003 | Hausmann et al. |
| 2010/0055358 | A1 | 3/2010 | Weaver et al. |

OTHER PUBLICATIONS

United States Patent and Trademark Office, Office Action for U.S. Appl. No. 15/177,361 dated Mar. 9, 2018.

*Primary Examiner* — Moshe Wilensky
(74) *Attorney, Agent, or Firm* — Lorenz & Kopf, LLP

(57) ABSTRACT

Methods for making inflatable interior panel arrangements for motor vehicles are provided. In one example, a method includes introducing a first molding material into a molding tool that has tooling surfaces. A second molding material is introduced into the molding tool. The molding tool is advanced to a closed configuration such that the tooling surfaces define a substantially enclosed cavity in the molding tool. An inflatable interior panel is formed including rotating the molding tool to cover the tooling surfaces of the substantially enclosed cavity with the first molding material and/or the second molding material. The inflatable interior panel includes an inflatable bladder section and an outer panel section that is integrally coupled to the inflatable bladder section and that has a panel portion stiffness greater than a bladder portion stiffness of the inflatable bladder section.

14 Claims, 3 Drawing Sheets

METHODS FOR MAKING INFLATABLE INTERIOR PANEL ARRANGEMENTS FOR MOTOR VEHICLES

TECHNICAL FIELD

The technical field relates generally to interior panels for motor vehicles, and more particularly to methods for making inflatable interior panel arrangements, such as inflatable knee bolsters or the like, for motor vehicles.

BACKGROUND

Incorporating safety systems into motor vehicles to help protect occupants during various types of collisions has traditionally been a priority for automobile manufacturers. Seatbelts, which keep occupants securely fastened to their seats, have been and continue to be one of the most prevalent safety devices used in the automotive industry.

In recent years, both the government and the automotive industry have realized the advantages that an inflatable occupant restraint system or airbag system can provide in addition to seatbelts. The traditional frontal airbag is disposed in the steering wheel or the instrument panel of the motor vehicle and acts to protect the head, chest, and pelvic area of a front occupant during a sudden deceleration caused, for example, by an accident. During such an event, however, the lower torso of the occupant may slide forward on the seat of the vehicle especially if a seatbelt is not worn by the occupant. This condition may increase the possibility of injury to the lower extremities, such as the knee and lower leg area, as well as the upper torso, of the occupant due to knee intrusion into the instrument panel. It is known to provide a restraint device, which is commonly referred to as a "knee blocker" or "knee bolster," for limiting this type of movement.

In one knee bolster device described in U.S. Pat. No. 6,302,437 issued to Marriott, an interior vehicle outer panel is operatively coupled to an airbag that is inflatable by a gas source (e.g., gas inflator). During inflation of the airbag, the outer panel is directed towards the lower extremities of an occupant to aid in limiting lower torso translation forward along the vehicle seat. The knee bolster device may be formed, for example, by injection molding the outer panel. The airbag is then coupled to the outer panel during a secondary fastening and/or joining operation(s) by mechanical means. Unfortunately, such secondary fastening and/or joining operations, which can include, for example, additional parts, such as fasteners, brackets, and the like, as well as additional labor, robots, and/or fixtures for forming the device after injection molding or otherwise after forming the outer panel, are relatively expensive and can include significant investment and/or operating costs.

Accordingly, it is desirable to provide methods for making inflatable interior vehicle panel devices for motor vehicles with improved manufacturing efficiencies and/or lower manufacturing costs. Furthermore, other desirable features and characteristics of the present disclosure will become apparent from the subsequent detailed description and the appended claims, taken in conjunction with the accompanying drawings and this background.

BRIEF SUMMARY

Methods for making inflatable interior panel arrangements for motor vehicles are provided herein. In accordance with an exemplary embodiment, a method for making inflatable interior panel arrangement for a motor vehicle comprises the steps of introducing a first molding material into a molding tool that has tooling surfaces. A second molding material is introduced into the molding tool. The molding tool is advanced to a closed configuration such that the tooling surfaces define a substantially enclosed cavity in the molding tool. An inflatable interior panel is formed comprising rotating the molding tool to cover the tooling surfaces of the substantially enclosed cavity with the first molding material and/or the second molding material. The inflatable interior panel comprises an inflatable bladder section and an outer panel section that is integrally coupled to the inflatable bladder section and that has a panel portion stiffness greater than a bladder portion stiffness of the inflatable bladder section.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
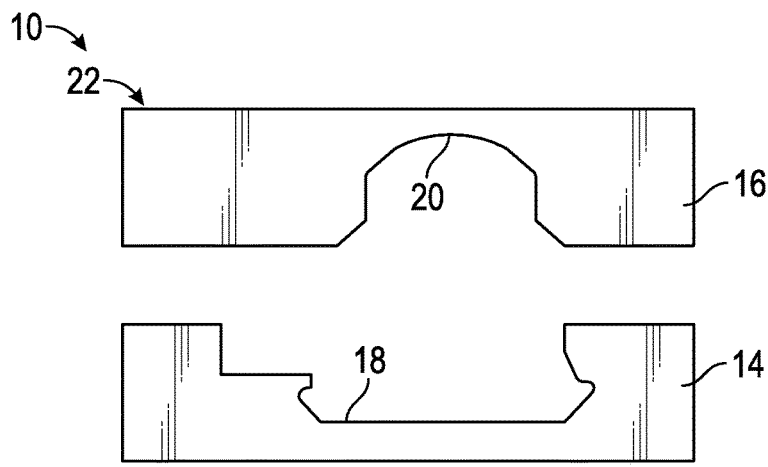
FIGS. 1-9 illustrate, in cross-sectional views, methods for making inflatable interior panel arrangements during various fabrication stages in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to methods for making inflatable interior panel arrangements for motor vehicles. The exemplary embodiments taught herein introduce a first molding material into a molding tool that has tooling surfaces. A second molding material is introduced into the molding tool. In an exemplary embodiment, the first molding material is deposited over the tooling surfaces associated with a first portion of the molding tool and the second molding material is deposited over the first molding material.

The molding tool is advanced to a closed configuration such that the tooling surfaces define a substantially enclosed cavity in the molding tool. In one example, the molding tool includes the first portion and a second portion that are matched mold portions and that are advanced towards each other to the closed configuration. In the closed configuration, the tooling surfaces associated with each of the first and second portions together defined the substantially enclosed cavity. In an exemplary embodiment, the molding tool is part of a rotational molding process and is rotated in the closed configuration to move at least a portion of the second molding material over the tooling surfaces associated with the second portion of the molding tool while at least a portion of the first molding material remains over the tooling surfaces associated with the first portion of the molding tool. As such, the tooling surfaces of the substantially enclosed cavity are cooperatively covered with the first and second molding materials.

In an exemplary embodiment, the first molding material and the second molding material are, independently, in a liquid phase and/or a molten condition before and/or during rotation of the molding tool to facilitate covering the tooling surfaces of the substantially enclosed cavity. In this embodiment, the first molding material is subsequently solidified to form a first solidified molded material and the second molding material is subsequently solidified to form a second solidified molded material. Together the first and second solidified molded materials define an inflatable interior panel that corresponds to the shape of the substantially enclosed cavity.

In an exemplary embodiment, the inflatable interior panel includes an outer panel section that comprises the first solidified molded material and an inflatable bladder section that comprises the second solidified molded material. The outer panel section is integrally coupled to the inflatable bladder section and is stiffer than the inflatable bladder section. Advantageously, in an exemplary embodiment, the relatively more flexible (i.e., less stiff) inflatable bladder section allows the bladder section to be effectively inflated by, for example, a gas inflator, to move the relatively more rigid more stiff) outer panel section towards the lower extremities of a vehicle occupant during a crash event to aid in limiting lower torso translation of the occupant forward along the vehicle seat. Moreover, advantageously, in an exemplary embodiment, by forming both the outer panel section and the inflatable bladder section together during the same rotational molding process, the outer panel section and the inflatable bladder section can be coupled together without requiring any secondary joining and/or fastening operations to thereby improve manufacturing efficiencies and/or lower manufacturing costs.

Figure 5:
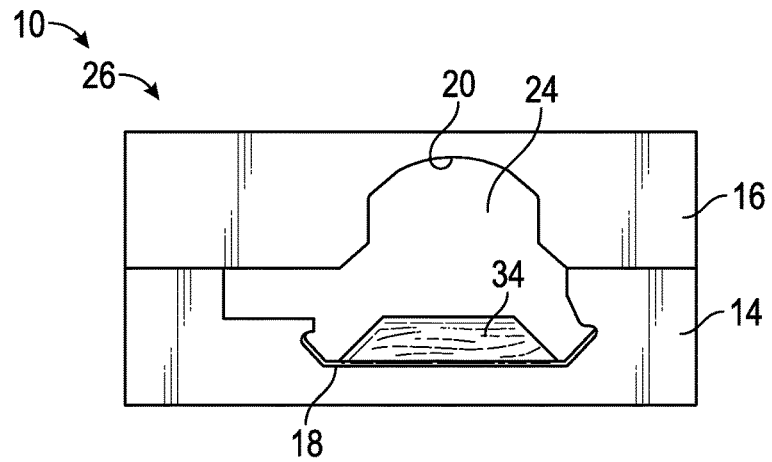

FIG. 1 is a sectional view of a molding tool 10 used in a rotational molding process (discussed in further detail below) for fabricating an inflatable interior panel 12 (shown in FIG. 7-9) of an inflatable interior panel arrangement 13 (shown in FIG. 9) in accordance with an exemplary embodiment. The molding tool 10 includes molding tool portions 14 and 16 that may be moved relative to each other during the rotational molding process as is well-known in the art. The molding tool portions 14 and 16 are a match die set each having tooling surfaces 18 and 20. The tooling surfaces 18 and 20 are accessible when the molding tool 10 is in an open configuration 22 (i.e., the molding tool portions 14 and 16 are spaced apart) as illustrated in FIG. 1, and define a substantially enclosed cavity 24 when the molding tool 10 is in a closed configuration 26 (i.e., the molding tool portions 14 and 16 are positioned in contact with each other) as illustrated in FIG. 5.

Figure 2:
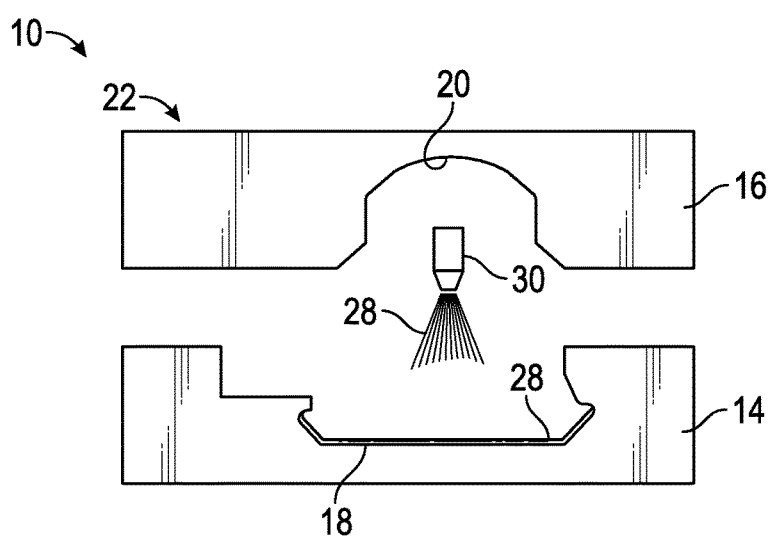

Referring to FIG. 2, a molding material 28 is introduced to the molding tool 10. The molding material 28 may be a thermosetting material such as a thermosetting polymer or pre-polymer (e.g., monomers, oligomers, or other polymeric precursor material(s)) or may be a thermoplastic material such as a thermoplastic polymer. Nonlimiting examples of materials suitable for the molding material 28 include polyurethanes, polyurethane prepolymers, thermoplastic polyurethanes (TPU), thermoplastic polyolefins (TPO), polypropylene, epoxies, epoxy urethane blends, combinations thereof, and the like. In an exemplary embodiment, the molding material 28 includes a curable polymeric precursor such as a polyester polyol(s), polyether polyol(s), or the like and a hardener such as an isocyanate (e.g., block or unblock isocyanate(s)). In an exemplary embodiment, the molding material 28 is deposited overlying the tooling surfaces 18 of the molding tool portion 14 in a liquid phase via a spraying device 30 during a spray process. Advantageously, in an exemplary embodiment, applying the molding material 28 in the liquid phase onto the tooling surfaces 18 facilitates the molding material 28 spatially conforming to match the tooling surfaces 18. Alternatively, the molding material 28 may be deposited overlying the tooling surfaces 18 of the molding tool portion 14 in a solid phase or powder form.

Figure 3:
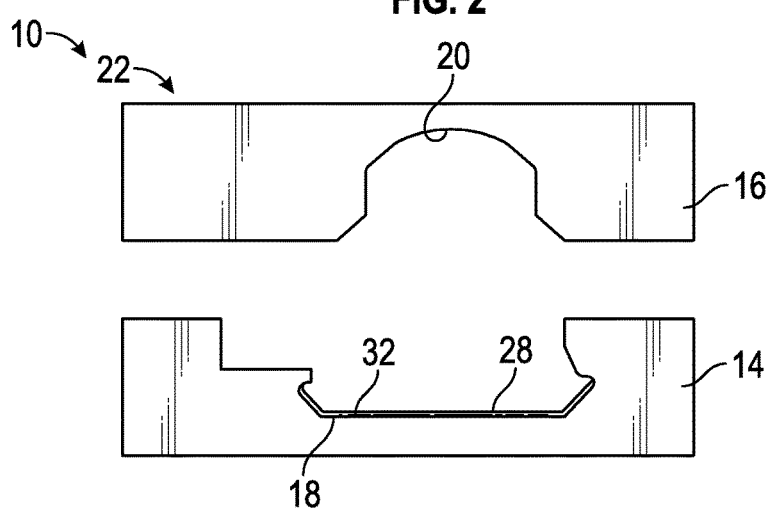

In an exemplary embodiment, the molding tool 10 is configured to be heated and/or cooled as part of the rotational molding process. For example, the molding tool portions 14 and 16 may independently include a fluid circuit or a portion(s) of a fluid circuit (not shown) that contains a heat transfer fluid (e.g., water, air, oil, or the like) and that is in fluid communication with a heating and/or cooling device (e.g., thermolator, heat exchanger, or the like) for regulating the temperature of the molding tool portions 14 and 16. As such and with reference to FIG. 3, the molding tool portion 14 may be heated to transfer heat to the molding material 28. In one embodiment in which the molding material 28 is a thermosetting material, such as a curable polymeric precursor with a hardener, the molding material 28 is heated and cured (e.g., hardener reacting with the curable polymeric precursor), to thereby solidify the molding material 28 to form a solidified molded material 32 (e.g., a relatively stiff or rigid polyurethane). In an alternative embodiment in which the molding material 28 is a thermoplastic material that is for example in a solid phase or powdered form, the molding material 28 is heated and melted to thereby form the molding material 28 in a molten condition. Advantageously, having the molding material 28 in the molten condition facilitates the molding material 28 spatially conforming to match the tooling surfaces 18. In an exemplary embodiment, the tooling surfaces 18 are heated to a temperature of 100 to 200° C.

Figure 4:
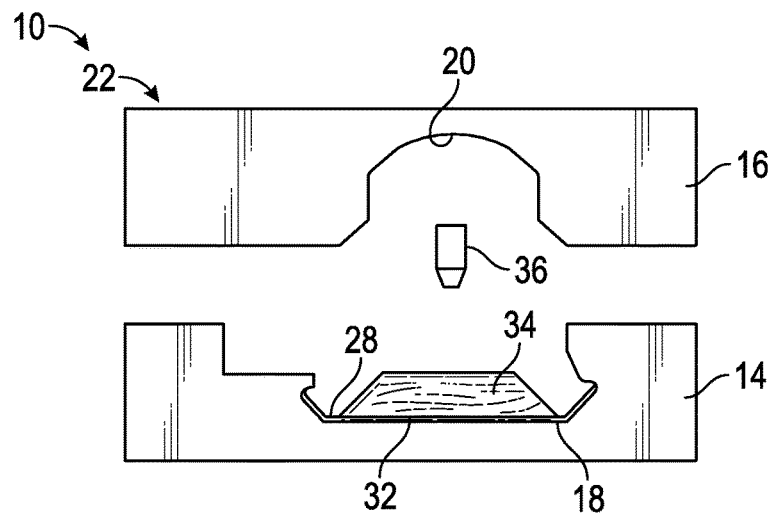

The process continues as illustrated in FIG. 4 by introducing an additional molding material 34 into the molding tool 10 overlying the molding material 28, which may be in the molten condition or the solid cured form as solidified molded material 32 as discussed above. In an exemplary embodiment, the molding material 34 is a different material than the molding material 28 and, as will be discussed in further detail below, ultimately forms a relatively more flexible material (and higher ultimate elongation material) than the solidified molded material 32 (e.g., molded form of the molding material 28). The molding material 34 may be a thermosetting material such as a thermosetting polymer or pre-polymer (e.g., monomers, oligomers, or other polymeric precursor materials) or may be a thermoplastic material such as a thermoplastic polymer. Nonlimiting examples of materials suitable for the molding material 34 include polyurethanes, polyurethane prepolymers, TPU, TPO, polypropylene, epoxies, epoxy urethane blends, combinations thereof, and the like. In an exemplary embodiment, the molding material 34 is a thermoplastic material such as TPU, TPO, or the like. In an exemplary embodiment, the molding material 34 is deposited in a powder form overlying the tooling surfaces 18 of the molding tool portion 14 (e.g., directly on the molding material 28 that is either in the molten condition or the cured solid form as the solidified molded material 32) via a depositing device 36. Alternatively, the molding material 34 may be deposited in a liquid phase overlying the molding tool portion 14.

Figure 6:
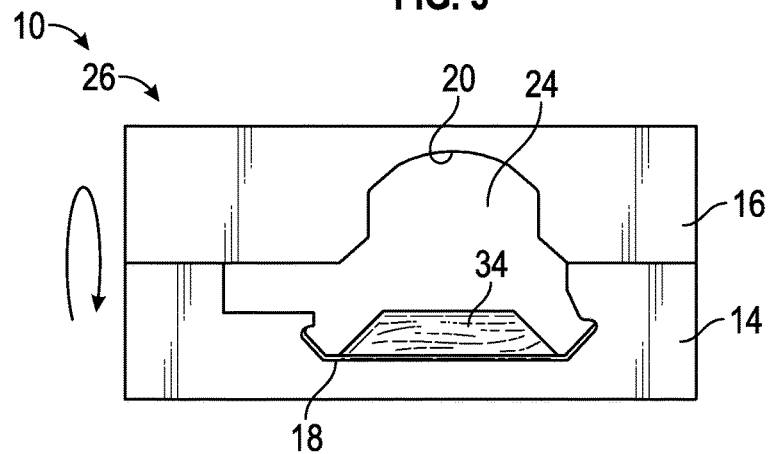
Figure 7:
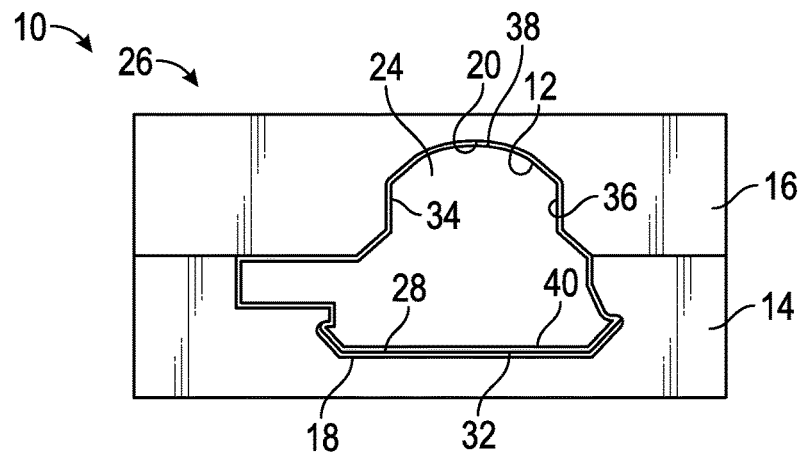

Referring to FIG. 5, the molding tool portions 14 and 16 are advanced towards each other to the closed configuration 26 and the tooling surfaces 18 and 20 together define the substantially enclosed cavity 24. The process continues as illustrated in FIGS. 6-7 by rotating the molding tool 10 as part of the rotational molding process to move at least a portion of the molding material 34 onto and/or over the tooling surfaces 20 of the molding tool portion 16. In an exemplary embodiment, at least a portion of the molding material 28 (e.g., either in the molten condition or cured solid form as solidified molded material 32) remains on and/or over the tooling surfaces 18 of the molding tool portion 14. As such, the tooling surfaces 18 and 20 are substantially completely covered by the molding material 28 and/or the molding material 34.

Further and as discussed above, the mold tooling portions 14 and 16 may be configured for heating and/or cooling. In an exemplary embodiment, the tooling surfaces 18 and 20 of the molding tool portions 14 and 16 are heated to a temperature of from about 100 to about 200° C. during the initial stages of rotating the molding tool 10. In an exemplary embodiment, the molding material 34 is a thermoplastic material and as the molding material 34, which is in a powder form, contacts the tooling surfaces 20, the molding material 34 melts to a molten condition. Advantageously, the molding material 34 in the molten condition facilitates the molding material 34 spatially conforming to match the tooling surfaces 20. Next, during the latter stages of rotating the molding tool 10, the molding tool portions 14 and 16 may be cooled to help solidify the molding material 34 to thereby form a solidified molded material 36. In an exemplary embodiment, the tooling surfaces 18 and 20 of the molding tool portions 14 and 16 are cooled to a temperature of from about 20 to about 80° C. Alternatively, in the embodiment in which the molding material 34 is a thermosetting material, the molding material 34 may be in a liquid form during the initial stages of rotating the molding tool 10. As such, when the molding material 34 contacts the heated tooling surfaces 20, the molding material 34 cures and solidifies to form the solidified molded material 36. Optionally, in this embodiment, during the latter stages of rotating the molding tool 10, the molding tool portions 14 and 16 may be cooled as discussed above.

As illustrated in FIG. 7, the solidified molded materials 32 and 36 are molded to a shape corresponding to the tooling surfaces 18 and 20 of the substantially enclosed cavity 24 and define the inflatable interior panel 12. In particular, the inflatable panel 12 includes an inflatable bladder section 38, which has a shape that corresponds to the tooling surfaces 20, and an outer panel section 40, which has a shape that corresponds to the tooling surfaces 18 and that is integrally coupled to the inflatable bladder section 38. In an exemplary embodiment, the outer panel section 40 comprises the solidified molded material 32, which is relatively stiff or rigid (e.g., relatively high flexural modulus), and the inflatable bladder section 38 comprises the solidified molded material 36, which is relatively flexible (e.g., relatively low flexural modulus) and having for example a relatively high elongation. As such, the outer panel section 40 has a panel portion stiffness greater than a bladder portion stiffness of the inflatable bladder section 38. In an exemplary embodiment, the solidified molded material 32 has a flexural modulus of from about 800 to about 1300 MPa or greater than about 1300 MPa at 23° C., and the solidified molded material 36 has a flexural modulus of from about 1 to about 500 MPa and an ultimate elongation of from about 25% to about 500% at 23° C.

Figure 8:
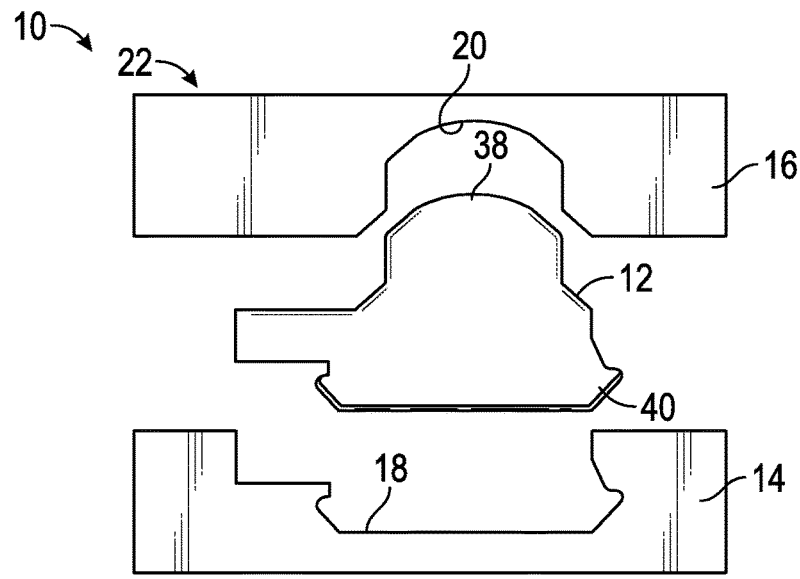
Figure 9:
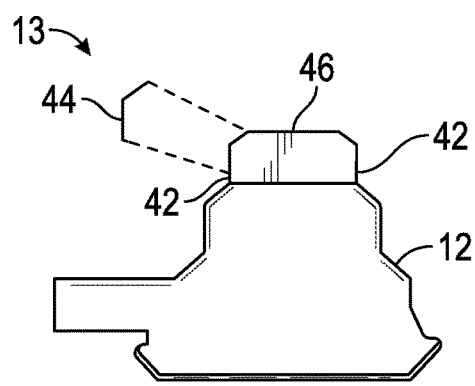

The process continues as illustrated in FIG. 8 by advancing the molding tool portions 14 and 16 away from each other to the open configuration 22 to open the substantially enclosed cavity 24 for removing the inflatable interior panel 12 from the molding tool 10. Referring to FIG. 9, an opening 42 is formed in the inflatable bladder section 38 by removing a portion 44 of the inflatable bladder section 38. Next, an inflator 46 is operatively coupled to the inflatable bladder section 38 about the opening 42 to form the inflatable interior panel arrangement 13. In an exemplary embodiment, the portion 44 is removed from the inflatable bladder section 38 using a die cutting operation or the like and the inflator 46 is operatively coupled to the inflatable bladder section using a welding operation. In an exemplary embodiment, the inflator 46 is configured to generate gas to inflate the inflatable bladder section 38 to advantageously move the outer panel section 40 towards the lower extremities of a vehicle occupant during a crash event to aid in limiting lower torso translation of the occupant forward along the vehicle seat.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method for making an inflatable interior panel arrangement for a motor vehicle, the method comprising the steps of:
   introducing a first molding material into a molding tool that has tooling surfaces;
   introducing a second molding material into the molding tool;
   advancing the molding tool to a closed configuration such that the tooling surfaces define a substantially enclosed cavity in the molding tool; and
   forming an inflatable interior panel comprising rotating the molding tool to cover the tooling surfaces of the substantially enclosed cavity with the first molding material and/or the second molding material, wherein the inflatable interior panel comprises an inflatable bladder section and an outer panel section that is integrally coupled to the inflatable bladder section and that has a panel portion stiffness greater than a bladder portion stiffness of the inflatable bladder section.

2. The method of claim 1, wherein during forming the inflatable interior panel the first molding material and the second molding material are, independently, in a liquid phase and/or a molten condition before and/or during rotating the molding tool to facilitate covering the tooling surfaces of the substantially enclosed cavity, and wherein forming the inflatable interior panel further comprises:
   solidifying the first molding material to form a first solidified molded material; and
   solidifying the second molding material to form a second solidified molded material, wherein the first solidified molded material has a higher flexural modulus than the second solidified molded material.

3. The method of claim 2, wherein solidifying the first molding material comprises forming the first solidified molded material having a flexural modulus of from 800 to 1300 MPa at 23° C.

4. The method of claim 2, wherein solidifying the second molding material comprises forming the second solidified molded material having a flexural modulus of from 1 to 500 MPa at 23° C.

5. The method of claim 2, wherein solidifying the second molding material comprises forming the second solidified molded material having an ultimate elongation of from 25% to 500% at 23° C.

6. The method of claim 2, wherein forming the inflatable interior panel comprises forming the outer panel section comprising the first solidified molded.

7. The method of claim 2, wherein forming the inflatable interior panel comprises forming the inflatable bladder section comprising the second solidified molded.

8. The method of claim 1, wherein introducing the first molding material comprises depositing the first molding material in a liquid phase overlying the tooling surfaces associated with a first portion of the molding tool.

9. The method of claim 8, wherein introducing the first molding material comprises depositing the first molding material that comprises a curable polymeric precursor and a hardener, and wherein forming the inflatable interior panel comprises curing the curable polymeric precursor with the hardener prior to introducing the second molding material and rotating the molding tool.

10. The method of claim 8, wherein introducing the first molding material comprises depositing the first molding material overlying the tooling surfaces associated with the first portion of the molding tool using a spray process.

11. The method of claim 1, wherein introducing the second molding material comprises depositing the second molding material overlying the tooling surfaces associated with a first portion of the molding tool, and wherein forming the inflatable interior panel comprises rotating the molding tool to move at least a portion of the second molding material over the tooling surfaces associated with a second portion of the molding tool.

12. The method of claim 11, wherein introducing the second molding material comprises depositing the second molding material in a powder form overlying the tooling surfaces associated with the first portion of the molding tool.

13. The method of claim 12, wherein forming the inflatable interior panel comprises:
applying heat to the second molding material in the powder form during rotation of the molding tool to melt the second molding material and form a molten second molding material overlying the tooling surfaces associated with the second portion of the molding tool; and
cooling the molten second molding material to form a second solidified molded material.

14. The method of claim 1, further comprising:
advancing the molding tool to an open configuration open the substantially enclosed cavity and remove the inflatable interior panel from the molding tool;
forming an opening in the inflatable bladder section; and
operatively coupling an inflator to the inflatable bladder section about opening.

* * * * *